(12) United States Patent
Lyon et al.

(10) Patent No.: US 7,372,595 B1
(45) Date of Patent: May 13, 2008

(54) FLEXIBLE IMAGE RENDERING SYSTEM UTILIZING INTERMEDIATE DEVICE-INDEPENDENT UNRENDERED IMAGE DATA

(75) Inventors: Richard F. Lyon, Los Altos, CA (US); Allen H. Rush, Danville, CA (US)

(73) Assignee: Foveon, Inc., San Jose, CA (US)

( * ) Notice: Subject to any disclaimer, the term of this patent is extended or adjusted under 35 U.S.C. 154(b) by 1282 days.

(21) Appl. No.: 10/100,250

(22) Filed: Mar. 14, 2002

Related U.S. Application Data

(63) Continuation-in-part of application No. 09/933,545, filed on Aug. 20, 2001, now abandoned.

(51) Int. Cl.
*H04N 1/40* (2006.01)

(52) U.S. Cl. .................. 358/1.9; 358/2.1; 358/3.24

(58) Field of Classification Search .............. 358/1.9, 358/2.1, 3.24, 3.27, 1.13, 1.15, 1.18, 518, 358/527; 348/207.2, 222.1, 333.12; 709/246
See application file for complete search history.

(56) References Cited

U.S. PATENT DOCUMENTS

| | | | |
|---|---|---|---|
| 5,606,365 A | 2/1997 | Maurinus et al. | |
| 5,806,420 A | 9/1998 | Erhard et al. | 101/37 |
| 5,867,214 A | 2/1999 | Anderson et al. | 348/231 |
| 5,883,380 A | 3/1999 | Sinor | 250/214 VT |
| 5,949,551 A | 9/1999 | Miller et al. | |
| 5,965,875 A | 10/1999 | Merrill | |
| 6,128,097 A | 10/2000 | Parker et al. | 358/1.2 |
| 6,426,801 B1* | 7/2002 | Reed | 358/1.16 |
| 6,515,758 B2 | 2/2003 | Uda et al. | 358/1.15 |
| 6,573,927 B2* | 6/2003 | Parulski et al. | 348/231.7 |
| 6,704,024 B2 | 3/2004 | Robotham et al. | 345/581 |
| 6,721,802 B1* | 4/2004 | Wright et al. | 709/246 |
| 6,785,019 B2 | 8/2004 | Anderson et al. | 358/1.9 |
| 6,937,370 B1* | 8/2005 | Nitta et al. | 358/518 |
| 7,027,172 B1* | 4/2006 | Parulski et al. | 358/1.15 |
| 2002/0049852 A1 | 4/2002 | Lee et al. | 709/231 |
| 2002/0122198 A1* | 9/2002 | Tsue et al. | 358/1.13 |
| 2002/0191206 A1 | 12/2002 | Anderson et al. | 358/1.13 |
| 2004/0196381 A1* | 10/2004 | Matsuzaka | 348/222.1 |

(Continued)

OTHER PUBLICATIONS

About Bibble at <<http://www.bibblelabs.com/about.html>> visited on Jan. 3, 2002, pp. 1-4.

(Continued)

*Primary Examiner*—Scott A. Rogers
(74) *Attorney, Agent, or Firm*—Sierra Patent Group, Ltd.

(57) ABSTRACT

A flexible, user-friendly computer-implemented image processing system is provided. The system includes a process to receive an image rendering request. The image rendering request includes an indication of raw image data and an indication of desired rendering output characteristics. A rendering process is configured to process the raw image data to generate at least one rendered image, based on an indication of a particular image acquisition device employed to generate the raw image data. In accordance with some embodiments, the rendering process includes a plurality of rendering sub-processes. Each sub-process corresponds to a separate image acquisition device, and the rendering process is configured to process the raw image data based on the sub-process corresponding to the indication of the particular image acquisition device employed to generate the raw image data.

32 Claims, 5 Drawing Sheets

U.S. PATENT DOCUMENTS

2005/0212914 A1* 9/2005 Seto et al. ............... 348/207.1
2006/0132821 A1* 6/2006 Nonaka et al. ............ 358/1.13
2006/0279636 A1* 12/2006 Sasaki ..................... 348/207.2
2006/0285761 A1* 12/2006 Kasperkiewicz et al. ... 382/254

OTHER PUBLICATIONS

Anonymous, (Oct. 1, 1989) "Graphic technology and photography—Colour characterisation of digital still cameras (DSCs) using colour targets and spectral illumination" ISO/TC42/WG18; ISO/TC130WG3, International Standard WD 4 of ISO 17323, International Organization for Standardization (ISO) Technical Committee ISO/TC 42 (Photograph) and ISO/TC 130 (Graphic Technology), 43 pages.

Donovan, W. (Project Leader ISO 12231) (Jan. 25, 2001) "Photography—Electronic still picture imaging—Terminology" ISO TC 42/SC N 4723; International Standard ISO/WD 12231.13; International Organization for Standardization (ISO) Technical Committee 42—Photograph, 32 pages.

Eastman Kodak Company (1999). "Reference Input Medium Metric RGB Color Space (RIMM RGB) White Paper" WG18 White Paper, Nov. 3, 1999, Secretariat ISO/TC42, Photographic and Imaging Manufacturers Association, Inc. Harrison, N.Y. 10528, U.S.A. 6 pages.

Photographic and Imaging Manufacturers Association, Inc. (May 18, 2001) "PIMA 7667, Photography—Electronic still picture imaging—Extended sRGB color encoding—e-sRGB", 29 pages.

Photographic and Imaging Manufacturers Association, Inc. (May 24, 2001) "PIMA 7466, Photography—Electronic still picture imaging—Reference input medium metric RGB color encoding: RIMM—RGB", 17 pages.

Süsstrunk, S. et al. (1999). "Standard RGB Color Spaces," Proceedings of the IS&T/SID 7th Color Imaging Conference: Color Science, Systems and Applications, Nov. 16-19, 1999, Scottsdale, Arizona, USA., pp. 127-134.

* cited by examiner

FLEXIBLE IMAGE RENDERING SYSTEM UTILIZING INTERMEDIATE DEVICE-INDEPENDENT UNRENDERED IMAGE DATA

TECHNICAL FIELD

The present invention relates to a system to process raw image data into rendered images and, more particularly, to a system to efficiently and flexibly perform such processing starting from raw image data generated by any of a variety of image acquisition devices.

BACKGROUND

Photography is a complex art in which the final products—photographs—are produced (typically on paper) from photo-optical information about subject scenes, as sensed by photographic film with the aid of a camera. It has long been recognized, e.g. by L. A. Jones in the 1930s, that a rendered reproduction whose brightness or reflectance ratios objectively matches the scene luminance ratios is not a very "good" photograph. Rather, it is desirable to "render" measured scene luminance to an artistically and psycho-visually preferred reproduction. In the field of black-and-white photography, this approach was developed to a high degree by Ansel Adams with his "zone system" of photography. A combination of techniques involving the camera, the scene lighting, the film, the film developing, and the film printing give the photographer a great deal of control over how a scene is rendered to produce an aesthetically pleasing photographic reproduction. The same techniques, and more, are applied in color photography.

Even standard "one-hour" or "drugstore" photo processing labs, and the design of standard films and papers, incorporate years of experience of making rendering decisions in an attempt to give the user an acceptable reproduction for most typical situations. Modern digital cameras and scanners similarly incorporate automatic rendering intelligence in an attempt to deliver acceptable image files—at least in the case of typical scenes. These approaches take the rendering decisions out of the hands of the photographer and, therefore, are not universally acceptable to serious professional and amateur photographers. Furthermore, the image files thus produced lead to degraded images if the tone curve is subsequently modified, as one might do with an image editing program such as Adobe Photoshop. This degradation is due to re-quantization noise. The degradation is very bad if the file is stored using lossy image compression such as JPEG, but is still significant even for files stored as uncompressed RGB data such as 8-bit TIFF, especially if the initial rendering has caused clipping of highlights, shadows, or colors.

Networked storage, retrieval, processing, and printing services related to image data are known in the art. Conventionally, images uploaded to such centralized services are generally regarded as "rendered images", such as are typically generated locally by image acquisition devices such as digital cameras or by film scanners; that is, the uploaded digital image data are representations of an intended reproduction, such as a print or a screen display. Adjustments to the rendered images may be supported within the service, but rendering decisions that have already been committed in the image acquisition device limit the range of adjustments possible, and limit the quality of reproductions that differ from the original rendering (since information of the original scene has been eliminated).

Digital cameras that save raw (unrendered) scene data are also known in the art. By saving raw scene data, instead of processed rendered images, flexibility is retained to generate high-quality rendered images later, after interactive specification of rendering parameters such as tone curves, sharpening, and color adjustments. Conventionally, software to perform such interactive specification of rendering parameters, and rendering from the raw scene data according to the specified rendering parameters, is typically provided in a unique form by each camera manufacturer that offers a "raw data file" option.

For example, professional digital cameras such as the Foveon II camera manufactured and sold by Foveon, Inc. of Santa Clara, Calif., have the capability to create raw data files and to save the raw data files locally (e.g., on an attached computer). A corresponding processing program, such as FoveonLab for the Foveon II camera, allows the user to control the rendering interactively. The raw data files created by the camera of each manufacturer are typically in a format proprietary to that manufacturer. As a result, there is a dearth of third-party software available for generating rendered images from the raw data files. In addition, the programs of the various manufacturers typically operate differently enough from each other that a proficient user of one such program must endure a rather steep learning curve before becoming a proficient user of another such program. Furthermore, whereas some such programs may have features that are particularly useful or function well for a particular purpose, a user cannot easily utilize these features with other programs.

With respect to access to raw data, the computer processing the raw data requires access to the raw data. As a result, the user must either manage the raw file storage locally, or the data should be accessible from a storage server at a reasonable data rate to support the interaction. Such raw data files are not widely readable or interoperable. As a result, the raw data files are not generally compatible with software applications nor are they generally suitable for sharing via a network.

In addition, after the user renders the image to an output file, of the desired artistic style and quality level, the rendered image is typically sent again over the network to a print server, at a remote site, to obtain a high-quality print. The user may also manage the mapping, or re-rendering, of data representing his desired reproduction into a specialized colorspace for the target printer, and therefore may need to manage several different output files to target different printers. The proliferation of raw and rendered files for the user to create, store, view, manage, and send to others creates an undesired complexity.

What is desired is a user-friendly system to flexibly and efficiently manage quality image rendering from raw image data.

SUMMARY

In accordance with one aspect, a system is provided operating on a computing resource that is accessible to a plurality of clients via a communication network. A storage service of the system operates on the computing resource and is configured to store unrendered image data corresponding to scenes. The unrendered image data may be, for example, raw image data or scene colorimetric data. A rendering service of the system also operates on the computing resource and is configured to process the unrendered image data to generate rendered images. In particular, the rendering service processes the unrendered image data responsive to requests from the clients communicated over the communication network, and the rendering processing is based on rendering parameters determined in accordance with the client requests.

In addition, a printing service may be provided to transform the rendered images into a tangible form, in accordance with printing requests from the clients.

In accordance with a further aspect, a flexible, user-friendly computer-implemented image processing system is provided. A raw image data converting process is configured to convert raw image data created by any of a plurality of image acquisition devices into a standard form of unrendered scene data. The raw image data converting process is based on an indication of the particular one of the image acquisition devices that created the raw image data. A rendering process is configured to process the unrendered scene data to generate at least one rendered image, independent of the image acquisition characteristics of the image acquisition device that created the particular raw image data.

DETAILED DESCRIPTION

Figure 1:
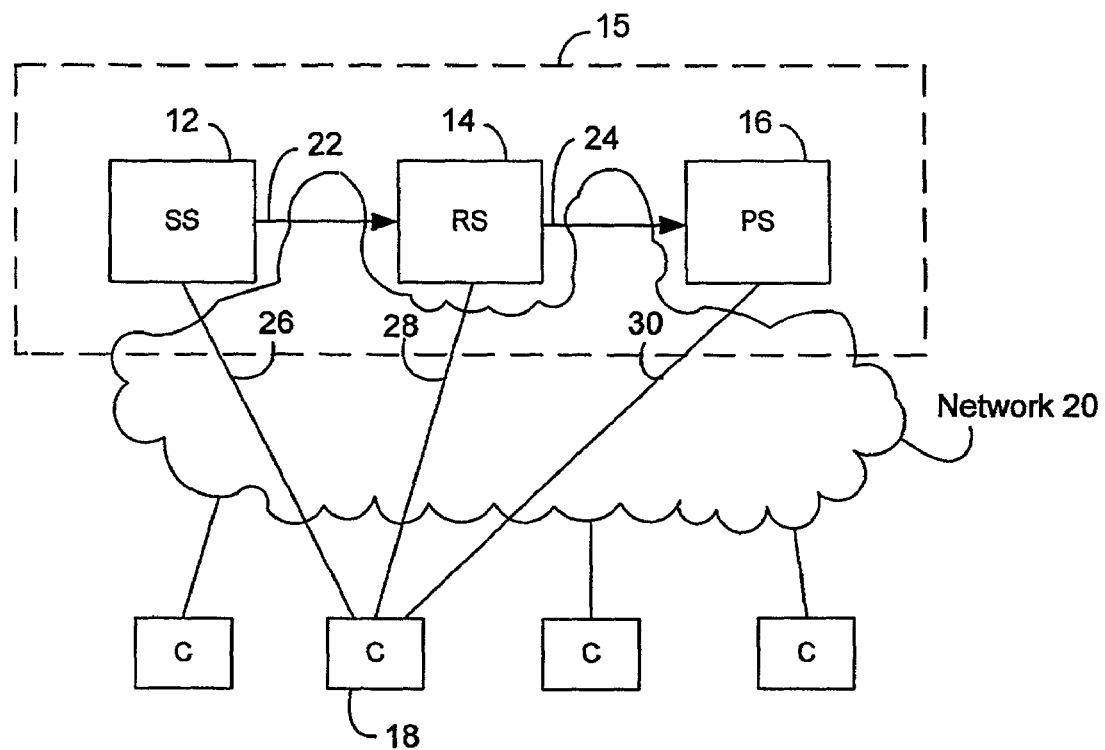
FIG. 1 is a block diagram illustrating a centralized service network to store and process raw image data.

The following description is illustrative only and not in any way limiting. It is intended that the scope of the invention be determined by the claims.

Before describing specific embodiments, it is useful to discuss data formats for unrendered image data. Unrendered image data typically falls into one of two rather distinct classifications: raw image data and scene colorimetric data. Raw image data refers to a representation of a scene as obtained by the sensor system of an image capture device such as a camera. By contrast, scene colorimetric data refers to a representation of a scene by which raw image data representing the scene has been converted into a standardized colorimetric space, in which each picture element (pixel) has an n-tuple (usually a triple) of values that has a defined one-to-one relationship with an XYZ triple representing an absolute color.

Several organizations have proposed imaging architectures based on scene calorimetric data, and have proposed specific colorspace representations for that purpose. For example, the standards committee ISO/TC42/WG18 has proposed (in WD4 of draft standard ISO 17321) a colorspace called ISO RGB to represent all XYZ triples as RGB triples, using the same primary chromaticities as the sRGB standard or the ITU-R BT.709 standard. The RGB values are allowed to be negative in order to allow a wide gamut of colors to be represented. As another example, Kodak has proposed a wide-gamut RGB space called RIMM for unrendered scene data, as a complement for a space called ROMM for rendered reproduction data; these colorspaces use nonnegative RGB values.

Conversion of raw image data to scene colorimetric data is typically complex, except possibly in the case where the color channel sensitivity curves of the sensor of the image capture device meet the Luther condition, i.e., are non-degenerate linear combinations of the CIE standard observer spectral curves. If the Luther condition is met, and if a sensor measures all three colors at each image pixel location, then the raw image data is already scene colorimetric data; and such data can be converted to another (standard) calorimetric space easily by multiplying each linearized RGB triple by a well-defined 3×3 matrix.

Most cameras do not come very close to meeting the Luther condition; typically a scene colorimetric XYZ triple or equivalent is imputed to each image pixel location by a 3×3 matrix multiply as noted above. However, the optimal matrix to use is not well defined, and depends on the illuminant, the spectra of colored materials in the scene, and preferences as to the pattern of color errors that is acceptable.

Maximum information about a scene is preserved by storing raw image data along with a description of the spectral sensitivity curves associated with the image capture device and any descriptive information about the scene that is available, such as illuminant type and subject type (e.g., portrait, rockscape, or flower scene). Approximate conversion to a scene colorimetric space inevitably results in loss of some information. Therefore, it is desirable to save and process the raw image data. In some embodiments, scene colorimetric data is saved, or both raw image data and scene calorimetric data may be saved.

Raw image data is processed based on the image capture device that generates it—both the general type and the characteristics of the specific image capture device. Different device types may employ different file formats and representations, and different specific devices may have slightly different spectral sensitivity curves and other characteristics for which calibration data may be obtainable. For the purposes of this specification, when we refer to an "image acquisition device" or "image capture device" we mean to include, wherever the context allows it, the concept of a "type" of such devices, such as a particular manufacturer's model or family of devices with some image acquisition characteristics in common.

In many digital cameras, color measurements are made through a filter mosaic, with one color filter at each location in a sensor array. Before the raw data is converted to imputed calorimetric values, each location in the array is given a value for the two out of three color channels that were not measured there. This process is known as de-mosaicing or interpolation. Scene calorimetric data for an image generated by such a camera therefore has three times as many data values as the original raw image data from which it is derived, increasing the amount of space required to store it (or requiring complex compression processes to reduce the amount of storage space required).

The de-mosaicing and other preprocessing operations for a digital camera of a particular type have many variants, including some that utilize proprietary algorithms of the camera manufacturers themselves. Conventionally, such manufacturers typically provide such algorithms either embedded within processing in the camera, or in computer programs compatible with either Windows or Macintosh computers or both. Other platforms are usually left with no support for processing raw image files from such cameras).

In some cases, the algorithms are provided as part of plug-in modules to widely used software packages such as web browsers or image editing programs. These approaches to making software available for processing raw image files make it difficult to have their raw files be widely acceptable or useable, since it is difficult for a large community of users (for example, of devices of different manufacturers and/or models or families) to keep up with all the updates and plug-in software packages for processing a variety of raw image data.

Other image acquisition devices provide raw image data in the form of "full-measured color," including a measured red, green, and blue sensor channel reading at each and every pixel location in an array. For example, the Foveon II camera separates an optical image through a color separating beam-splitter prism assembly and captures three full arrays of optical intensity values to make up a full-measured RGB raw data file. The resulting raw data files are large, but they provide correspondingly higher image quality when processed and rendered. Such files naturally require different pre-processing operations than files from color filter mosaic cameras. Future cameras using solid-state sensors that measure three color channels at each location, using techniques such as disclosed in U.S. Pat. No. 5,965,875, may also produce full-measured color raw image data files.

Now that image data formats for image data have been discussed, attention is turned to describing particular embodiments. Broadly speaking, in accordance with some of the described systems, the storing and processing associated with raw image data is centralized in a widely accessible networked service. Individual users do not need to update any software to make use of a new camera type or file format. The centralized service can update the centralized processing (by, for example, obtaining software updates from the camera manufacturers), and camera manufacturers need not support multiple computing platforms for storing and processing image data.

Referring now to FIG. 1, a service network 15 comprises a storage service 12, a rendering service 14 and a printing service 16.

The storage service 12 stores raw image data submitted by a client 18 via the communication network 20 as indicated by connection path 26. (It is to be understood that the connection path 26, like the other "connection paths" disclosed in FIG. 1, may not be permanent connections and may be, for example, ephemeral connections such as may occur over the internet.) In some embodiments, scene calorimetric data is also stored by the storage service 12. The client 18 can also retrieve files via connection path 26. The client 18 may be, for example, a standalone computing device such as desktop computer or it may be, for example, an image capture device capable of connecting directly to the communication network 20 for communication with the service network 15.

The rendering service 14 is in communication with the storage service 12 to receive raw image data from the storage service 12 via connection path 22 in response to requests submitted by the client 18 via the communication network 20 as indicated by connection path 28. The connection 22 (and the connection 24, discussed later) is shown as being via the communication network 20, but may be by other means, such as a communication network other than the communication network 20, or need not even be via a communication network at all, for example, if several of the services are run on the same computer. The rendering service 14 processes the raw image data received from the storage service 12 to, based on rendering parameters, generate a corresponding rendered image. The client 18 may be in communication with the rendering service 14 via the connection path 28 to preview rendered images and interactively adjust and review rendering parameters.

Client 18 may also communicate with the printing service 16 via the communications network 20 as indicated by connection path 30 to request that the rendered images generated by the rendering service 14 be printed or otherwise embodied on a tangible medium (e.g., "burned" onto a compact disc).

Other embodiments may employ different paths than illustrated in FIG. 1, and services of the service network 15 may be implemented on a computing resource such as one or more communicating processes, on one or more computers or other processing devices. Typically, such communication is via a communications network, such as a local-area network, the internet, the public switched telephone network, or a combination of such communications networks.

Raw image data stored by the storage service 12 preferably includes sufficient identifying information and characterization information for the servers to read and interpret the data, to find the appropriate preprocessing routines and information regarding conversion to scene calorimetric data. Such conversion information may include a calibration matrix, or several matrices for different illuminants, or spectral sensitivity curves from which such matrices may be computed according to some specified color error preferences. The storage service 12 accepts raw image data from a variety of sources, such as the raw image file formats of different manufacturers or of different camera families. Each such source may have different file formats and different kinds of additional characterization, calibration, and scene information associated with it. For each different raw image data type, corresponding preprocessing routines of the storage service 12 convert raw image data of that type to imputed scene colorimetric data for further rendering.

Figure 2:
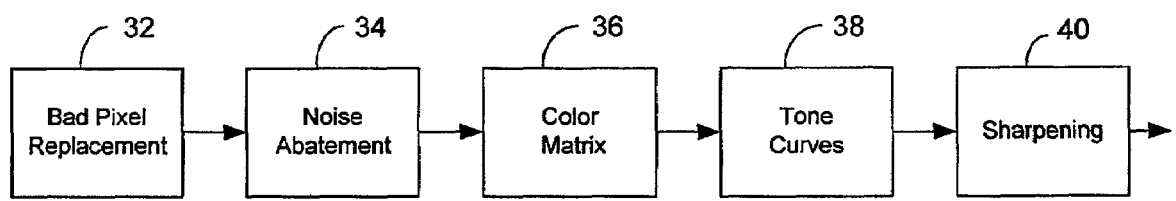
FIG. 2 is a block diagram illustrating a rendering process flow utilized in the rendering service of the FIG. 1 service network.

Referring now to FIG. 2, a particular embodiment of the rendering service 14 is described. As shown in FIG. 2, the rendering service 14 is implemented as a pipelined sequence of image processing steps. Some or all of the steps shown in FIG. 2, each including operations on all the pixel values, are included. Turning now to the specific steps, Bad Pixel Replacement 32 replaces known bad pixel values with reasonable computed values (e.g., based on a neighborhood average). Noise Abatement 34 is a collection of nonlinear filtering operations such as despeckling, dequantization, and chroma blur to incorporate known information about typical image statistics and about typical noise statistics of the image capture device from which the raw image data was generated, and to remove some amount of noise-like structure, possibly with user adjustment of tradeoffs. Color Matrix 36 is a colorspace conversion operation that may include not just a colorimetric transformation to a different space, but also user preferred saturation, white balance, and other color adjustments, including an overall exposure compensation. Tone Curves 38 is a nonlinear mapping of the lightness scale to give user preferred contrast, highlight compression, shadow compression, and perhaps even special effects such as posterization. Sharpening 40 enhances the high-frequency detail of an image, to give it a sharper look or to precompensate for blurring that will occur in a subsequent printing operation. These steps may be varied, and different ordering and combinations of them included. Preferably, the user has control over the steps that affect the final appearance of the rendered image.

The rendering process in accordance with some embodiments also includes some or all of the steps of cropping, conversion to a printer colorspace, and resampling to an output resolution. The conversion to a printer colorspace may be implemented, for example, via a matrixing computation or a multidimensional look-up table (for example, as utilized by color management engines that use ICC profiles for colorspace conversion).

Typically, the rendering parameters may be interactively adjusted by a client 18 of the service network 15 by being provided (via link 28), typically with the user viewing low-resolution previews and zoomed-in windowed previews of the effects of the rendering adjustments in real time. After the user has settled on particular user-adjustable parameters, the client may elect to download a larger higher-resolution rendered image, or may direct the printing service 16 of the service network 15 to produce a print based on the rendered image data provided via the communications network 20 via link 24 from the rendering service 14 to the printing service 16. The service network 15 may store the resulting rendered image data for later re-use, or may simply store the parameters for recreating the rendered image data from the raw image data.

Besides adjusting the rendering according to the client's preferences, the rendering service 14 may make some adjustments automatically. For example, a controlled degree of sharpening may be applied to compensate the known blurring characteristics of a printer operated as part of the printing service 16, even though the client has no specific knowledge of the printer to be used. In another example, the tone curves and colors may be adjusted to compensate for known printer characteristics when the client requests a print of the printing service 16.

Other adjustments that are available to the artistic client may preferably also be automatically adjusted when the client so desires. For example, a client may wish to have a large set of images automatically rendered and printed, in much the same way as is now done by photo processing labs that serve consumers, rather than addressing each image individually.

The service network 15 also includes an indexing and searching service. The indexing and searching processes image metadata available in the raw image data, when appropriate readers for the metadata in the file format are available. Searching based on image form, color, and subject content is also supported.

The storage service 12 includes multi-level storage, wherein small image "thumbnails" may be accessed, viewed, and searched quickly, while larger files may need longer to retrieve from secondary, tertiary, or offline storage. A system of storage service fees reflects storage policy options selected by the client, so that fast access to a large collection is possible, but costs more.

The printing service 16 provides flexible final product production and delivery options. For example, the service may be utilized as a simple print service, allowing clients to order prints by simply paying for the printing; the prints are then mailed to the buyer. Other more flexible options include a way for a buyer to direct the output to a mailing list, so that a client can, for example, design and mail out seasonal greeting cards directly from the service. The service may also act as an agent for the client photographic artist or art owner, allowing buyers to purchase copies at prices set the owner, with payment beyond the printing cost being delivered back to the art owner.

In accordance with some embodiments, most if not all of the functions of the rendering service, rather than being carried out by a rendering service accessible to clients via a communication network, are carried out by the clients locally. However, as is described with reference to FIG. 3, the client rendering application is configured in such a manner to address drawbacks of the conventional rendering systems.

Figure 3:
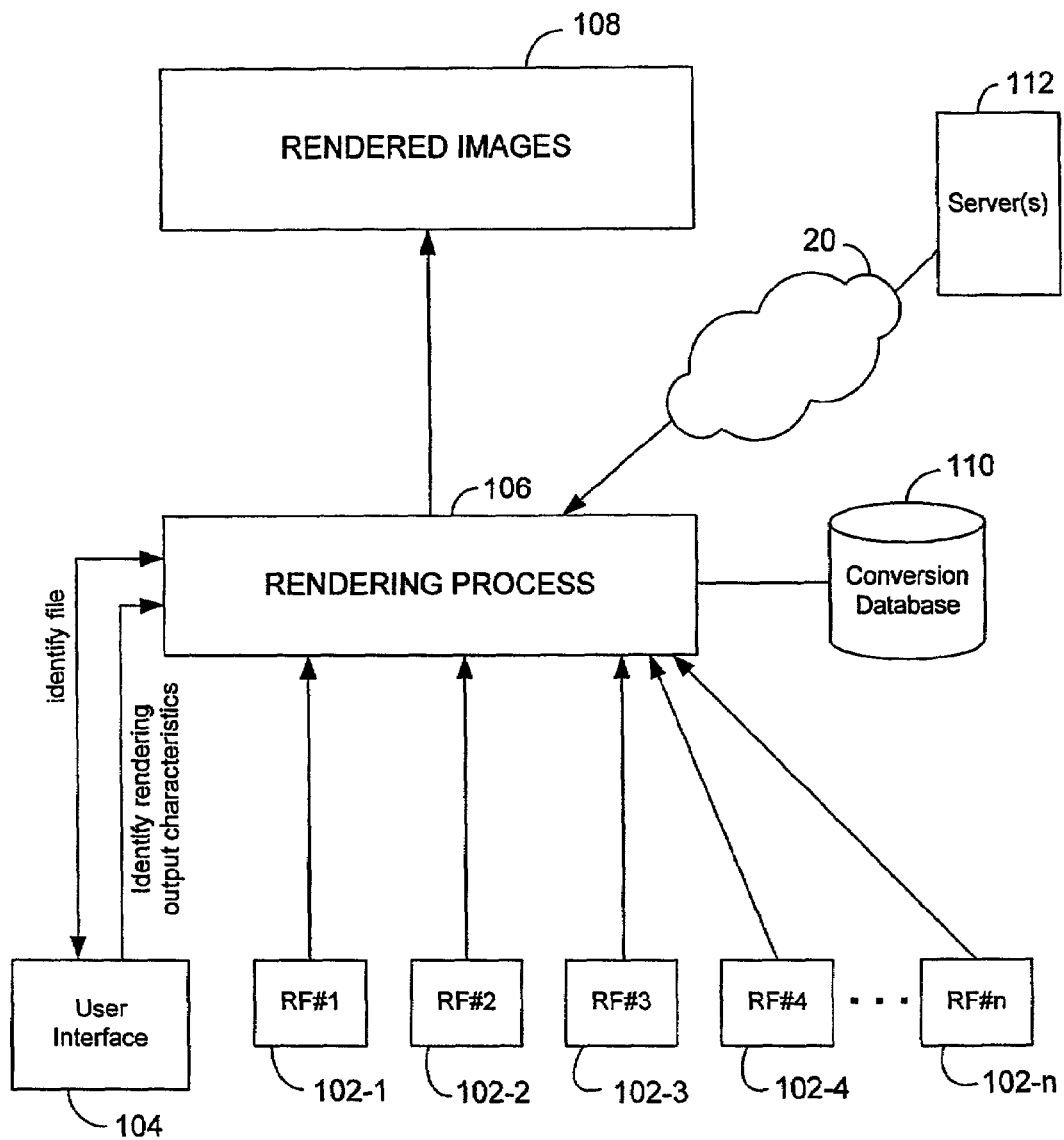
FIG. 3 is a block diagram illustrating a flexible locally-based architecture for image rendering.

FIG. 3 is a block diagram illustrating a locally-based architecture employed to convert a collection of raw image data into rendered images. The collection of raw image data may include, for example, the raw image data itself and auxiliary data associated with the raw image data. For example, the collection of raw image data may be stored in a file, and the auxiliary data may be the file name and/or data stored in a header of the file.

Referring to FIG. 3, the raw image data is stored in individual files RF#1 102-1, RF#2 102-2, . . . , RF#n 102-*n* (in this description, generically RF 102). The files RF 102 are created by various image acquisition devices such as digital cameras or film scanners. Via a user interface 104 to a rendering process 106, a user specifies particular raw image data to render by identifying to the rendering process 106 the particular file RF 102 that contains that raw image data. Furthermore, the user may specify desired characteristics of the output rendered image. This is different from specifying the rendering parameters themselves, which depend on the format of the raw image data including, for example, characteristics of the image acquisition device that created the raw image data. By making the user interface 104 standard across all raw image data formats, usability is significantly enhanced.

In accordance with some embodiments, the rendering system automatically detects the format and characteristics of the raw image data from the identified file RF 102 (for example, based on header information in the file RF 102 or based on some characteristic of the filename such as the filename extension) and applies the appropriate processing to achieve the output rendered image with the user-specified characteristics. For example, the processing may be defined in terms of conversion parameters associated with the file type of the identified file RF 102 (and, by extension, the characteristics of the image acquisition device that created the raw image data) stored in a conversion database 110.

While FIG. 3 illustrates the conversion database 110 being local to the rendering process 106, the conversion database 110 in accordance with some embodiments is more globally accessible, from one or more servers 112 via the communications network 20. In addition, the processing associated with a particular raw image format may be upgraded from the one or more servers 112 via the communications network 20.

Figure 4:
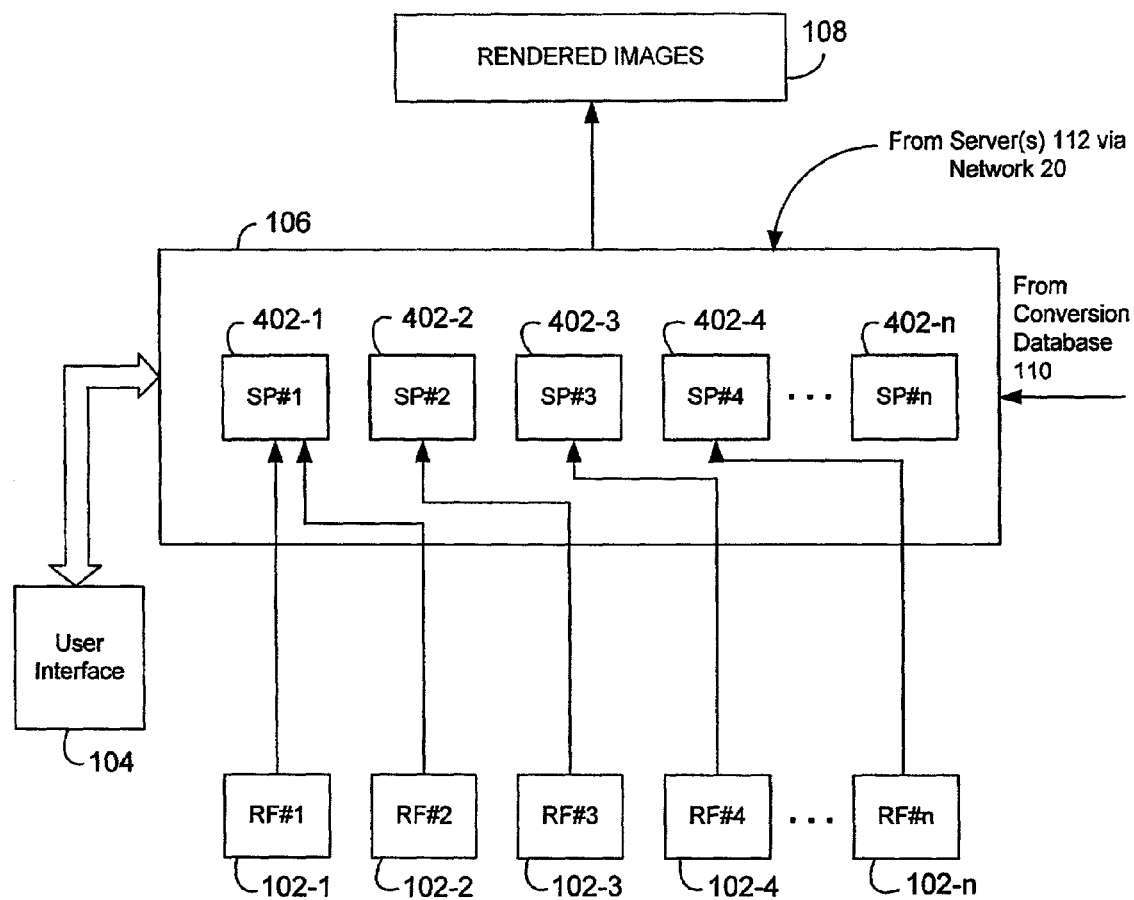
FIG. 4 is a block diagram illustrating the rendering process of FIG. 3 in greater detail.

FIG. 4 illustrates how, in one embodiment, the rendering process 106 is implemented as a collection of n processes, or sub-processes, SP#1 402-1 through SP#n 402-*n*, each of the processes corresponding to a separate type of image acquisition device. For example, FIG. 4 illustrates that process SP-#1 402-1 corresponds to the type of image acquisition device that generated the raw image data in file RF#1 102-1 and RF#2 102-2. The remaining processes 402-2 through 402-*n* correspond to other types of image acquisition devices.

To support a new type of image acquisition device, a new process 402 is provided by, for example, downloading the new process 402 to the rendering process 106 from the server(s) 112 via the network 20 using well-known methods. The new process 402 may be provided, for example, at the web site of the manufacturer or other provider of the image acquisition device, or by a third party. Similarly, the manufacturer or other provider or an image acquisition device, or a third party, may provide upgraded or otherwise modified rendering processing by downloading a modified process 402 to the rendering process 106. In some embodiments, it is determined automatically whether it is necessary to provide the new, upgraded or otherwise modified process and, furthermore, the downloading is also performed automatically with little or no user intervention. In some embodiments, the new process 402 is provided to the rendering process 106 by the user providing a disk supplied, for example, by the manufacturer along with an image acquisition device.

In any event, the user interface 104 to the rendering process 106 is preferably uniform across all processes 402, no matter which process 402 is actually being employed by the rendering process 106 to generate rendered images.

Figure 5:
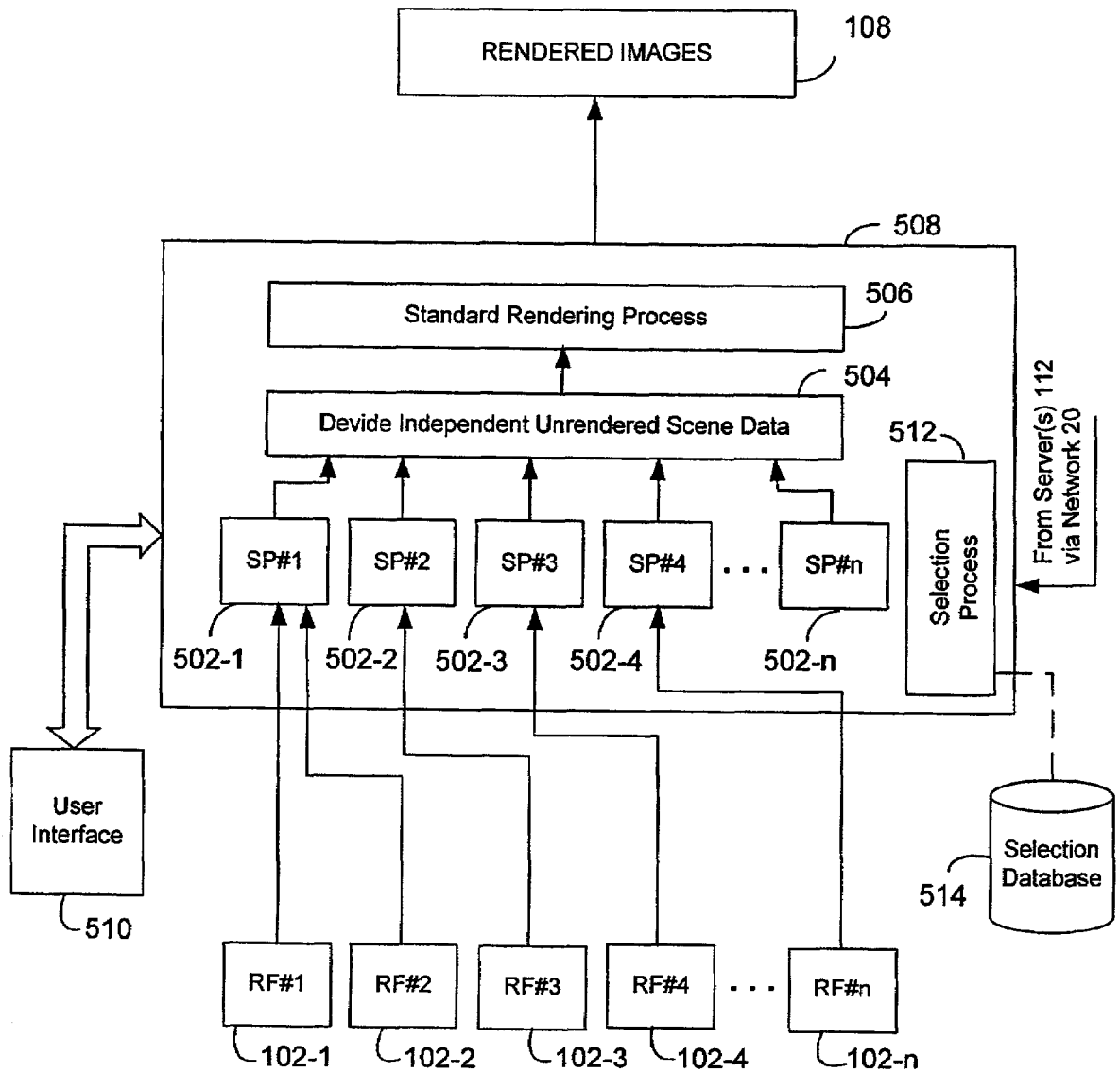
FIG. 5 is a block diagram illustrating an architecture in which raw image data are converted to a device-independent format of unrendered scene data before being rendered by a standard rendering process.

FIG. 5 is an architectural block diagram of a system in which the raw image data in the files RF102 are converted to a device-independent format of unrendered scene data, indicated by reference numeral 504 in FIG. 5. FIG. 5 illustrates how, in one embodiment, a collection of n converting processes C#1 502-1 through C#n 502-n are provided, each of the converting processes corresponding to a separate type of image acquisition device. For example, FIG. 5 illustrates that converting process C#1 502-1 corresponds to the type of image acquisition device that generated the raw image data in file RF#1 102-1 and RF#2 102-2. The remaining converting processes 502-2 through 502-n correspond to other types of image acquisition devices. Furthermore, a standard rendering process 506 is provided to render the image represented by the raw image data from the unrendered scene data 504.

The collection of converting processes 502 may be initially empty (n=0), in which case at least one converting process must be added to the collection to make the system operable on raw image data.

The converting processes 502 communicate unrendered scene data 504 via a predetermined or standardized software interface or programming interface to the single rendering process 506. A standardized software interface may be what is sometimes called an application programming interface (API) or what is sometimes called a plugin programming interface, or may be another interface of that general sort. Anyone in possession of the interface specification can potentially provide new converting processes. The unrendered scene data 504 may conform to a particular colorspace and encoding specification of unrendered scene colorimetric image data. Alternately, the unrendered scene data 504 may be represented in an unrendered scene colorimetric space as specified by a matrix, rather than in a predetermined colorspace; communication of such a matrix may therefore be a part of the software interface to the rendering process 506. In any case, the format and representation of scene calorimetric data is uniform across all types of image acquisition devices, even if the parameters of the representation, such as a matrix, are flexible.

Put simply, a mechanism is provided by which each converting process 502 customized (for example, by preconfiguring it) to a particular type of image acquisition device. As a result, each image acquisition device manufacturer has flexibility to provide a converting process for its image acquisition device to optimize the interpretation of raw image data produced by its image acquisition device and the imputation of scene colors based on that raw image data.

According to another aspect of the present invention, more than one software interface between converting processes and the rendering process may be provided. For example, one interface leaves substantially all of the rendering to the standard rendering process 506, while a second interface allows a converting process 502 the option to do more of its own rendering, such as leaving only the output color space conversion to be performed by the standard rendering process 506. In this way, the providers of processes 502 have an ability to add value or differentiation beyond the standard rendering options, but still have the ability to work through the standard rendering. Users can be offered the choice between two or more such rendering options via a mechanism in the user interface 510. The user interface 510 to a particular converting process 502 may be uniform, regardless of the type of image acquisition device to which that particular converting process corresponds. To support a type of image acquisition device for which there is no converting process 502 already, a converting process 502 is provided by, for example, downloading the converting process 502 to the rendering process (indicated by reference numeral 508 in FIG. 5) from the server(s) 112 via the network 20 using well-known methods. The converting process 502 may be provided, for example, at the web site of the manufacturer or other provider of the image acquisition device, or by a third-party. In some embodiments, it is determined automatically (by, for example, a well-known method) whether it is the necessary to provide the new, upgraded or otherwise modified converting process and, furthermore, the downloading is also performed automatically with little or no user intervention. Furthermore, while the user interface 510 may be standard, a custom user interface for a particular converting process 502 may also be provided as part of the user interface 510 via the standardized programming interface as discussed above.

In accordance with one embodiment, a first method is provided to handle the selection and loading of the converting process 502 for a particular type of device. In the first method, a selection process 512 of the rendering system uses the programming interface to ask each of the available converting processes 502 whether it can handle the raw data file in question, giving each process 502 the opportunity to examine the filename and data to make its determination. If none of the available converting processes 502 can handle the file, the selection process 512 causes the user interface 510 to instruct the user concerning his options for how to find and install additional converting processes 502 (for example, to provide a disk or to visit a provider's web site).

In accordance with other embodiments, the selection process 512 of the rendering system accesses a database 514 of conditions to decide which converting process 502 to use for a particular file, rather than passing the file to the available converting processes 502 and having the converting processes 502 make the determination. The database 514 of conditions can be built into the rendering system, can be extended on the local machine, and can be further extended to a network server, thereby providing a way for the accessible information to expand and be updated over time. For each converting process known, the database includes information for testing conditions. Examples of such conditions include a corresponding filename extension, what values are present in certain header bytes (for example, as file type signatures), what ranges of values are present in other header bytes (for example, as a range of file format version numbers, a range of model numbers, or a range of image data sizes), and logical combinations of the results of such tests. To decide which converting process 502 to use, the selection process 512 evaluates the conditions in the database 514 until determining that the conditions for a converting process 502 are satisfied. Well-known database access methods may be used to make the process more efficient than evaluating every condition. With this method, a converting process can be selected before it is locally available; after a converting process is selected, if it is not available locally, it can be downloaded automatically, added to the collection and then can be loaded and executed. The next time converting processing is to be carried out for the type of image acquisition device to which the downloaded converting process corresponds, the converting process will already be locally held in the local database.

In this second embodiment, selection of the converting process appropriate for image data generated by a particular type of image acquisition device is made by the rendering system. This is in contrast to the first embodiment described above, where each available converting process makes its own decision as to whether it is the appropriate converting process, so no method of specifying conditions need be utilized in the first method.

In the case of a networked rendering service, the local machine referred to with respect to finding and loading converting processes may be the networked resource controlling the converting process.

While embodiments and applications have been shown and described, it is apparent to those skilled in the art that many more modifications than mentioned above are possible without departing from the inventive concepts herein. The invention, therefore, is not to be restricted except in the spirit of the appended claims.

The invention claimed is:

1. An image rendering program on a computer readable medium, tangibly embodying a set of instructions executable by a machine to perform a method comprising:
   a selection process configured to select, based on properties of a collection of raw image data to be converted, one of a set of data converting processes, each said data converting process configured to convert raw image data created by a corresponding image acquisition device type into a predetermined representation of unrendered scene data;
   a rendering process configured to process said unrendered scene data in said predetermined representation to generate data representing at least one rendered image; and
   an update process configured to add an additional data converting process to the set of data converting processes.

2. The image processing rendering program of claim 1, wherein:
   the update process is configured to add said additional data converting process to said set of data converting processes based on an indication from said selection process that none of said data converting processes of said set of data converting processes corresponds to said type of image acquisition device that created said raw image data to be converted.

3. The image processing rendering program of claim 1, further comprising:
   a user interface process configured to receive an indication of the additional data converting process from a user and to provide said indication to the update process.

4. The image processing rendering program of claim 3, wherein:
   the user interface process is further configured to instruct the user how to locate the additional data converting process.

5. The image processing rendering program of claim 1, further comprising:
   a user interface process, configured to interact with the user to determine said rendering control input to the rendering process, wherein the operation of the user interface process is independent of the selected one data converting process.

6. The image processing rendering program of claim 1, wherein:
   at least some of the data converting processes are configurable to perform at least some rendering processing on the raw image data.

7. The image processing rendering program of claim 6, wherein:
   the rendering process is configurable based on an indication from the selected data converting process.

8. The image processing rendering program of claim 6, wherein:
   the rendering process is configurable based on an indication from the selected data converting process of particular rendering processing carried out by the selected data converting process.

9. The image processing rendering program of claim 8, further comprising:
   a user interface process, configured to accept data converting control input to control the rendering processing performed by the selected data converting process on the raw image data.

10. The image rendering program of claim 1, wherein said selection process is configured to initiate each data converting process in said set of processes to determine whether that data converting process corresponds to the type of the image acquisition device that created said raw image data to be converted and to provide an indication thereof to said selection process.

11. The image rendering program of claim 10, wherein:
    said collection of raw image data is characterized by a name; and
    said selection process is configured to provide said name to said data converting processes.

12. The image rendering program of claim 10, wherein said selection process is configured to select said one data converting process based on said indications provided by each said data converting process.

13. The Image rendering program of claim 1, further comprising:
    a user interface process configured to receive an indication of the additional data converting process from a user and to provide said indication to the update process.

14. The image rendering program of claim 1, wherein said selection process is configured to select said one data converting process by testing said collection of raw image data against selection conditions corresponding to each data converting process.

15. The image processing rendering program of claim 14, wherein:
    said update process causes said selection conditions to include selection conditions corresponding to said additional data converting process.

16. The image rendering program of claim 14, wherein:
    said collection of raw image data is characterized by a name; and
    said selection conditions include at least one of:
    constraint on name by which said collection of raw image data is characterized; and
    constraint on said raw image data.

17. The image processing rendering program of claim 14, wherein:

the selection process is configured to select the one data converting process based on the raw image data.

18. The image rendering program of claim 14, wherein:
said collection of raw image data includes auxiliary data associated with the raw image data, and
said selection conditions include at least one constraint on said auxiliary data.

19. The image rendering program of claim 18, wherein at least one of:
said auxiliary data includes an indication of a version of a format of the collection of raw image data and said selection condition includes the version being with a particular range;
said auxiliary data includes an indication of a model of an image acquisition device that created the raw image data and said selection condition includes the model being within a particular range; and
said auxiliary data includes a signature indicating a type of the collection of the raw image data and said selection condition includes the signature being a particular signature.

20. The image rendering program of claim 18, wherein:
said selection conditions include image data size being within a particular range.

21. The image processing rendering program of claim 10 or 14, wherein:
said update process is configured to retrieve said additional data converting process via a network to add said additional data converting process to said set of data converting processes.

22. A image processing program on a computer readable medium, tangibly embodying a set of instructions executable by a machine to perform a method comprising:
a user interface process configured to receive, from a user, desired output characteristics of a rendered image;
a selection process configured to select one of a set of rendering processes based on an indication of a type of image acquisition device that generated created the raw image data, the one rendering process configured to generate the rendered image from raw image data based on the desired output characteristics and
a type determination process to automatically determine the type of image acquisition device that created the raw image data and to provide an indication thereof to the selection process.

23. The image processing program of claim 22, wherein:
the type determination process determines the type of image acquisition device that created the raw image data based on a filename of a file containing the raw image data.

24. The image processing program of claim 22, wherein:
the type determination process determines the type of image acquisition device that created the raw image data based on data auxiliary to the raw image data in a file containing the raw image data.

25. The image processing program of claim 22, further comprising:

an update process configured to add an additional rendering process to the set of rendering processes.

26. The image processing program of claim 25, wherein:
the update process is configured to add the additional rendering process based on the selection process determining that one of the set of rendering processes corresponds to the type of image acquisition device that created the raw image data.

27. The image processing program of claim 25, wherein:
said selection processes selects based on selection conditions corresponding to the rendering processes; and
said update process causes said selection conditions to include selection conditions corresponding to said additional rendering process.

28. An image processing program on a computer readable medium, tangibly embodying a set of instructions executable on a machine to perform a method comprising:
a user interface process configured to receive, form a user, desired output characteristics of a rendered image; and
a rendering process that retrieves conversion parameters based on an indication of a type of image acquisition device that created particular raw image data, the rendering process configured to generate the rendered image from the particular raw image data using the retrieved conversion parameters and based on the desired output characteristics and wherein
the operation of the user-interface process is independent of the type of image acquisition device that created the particular raw image data; and
the retrieving process generates the indication of the type of image acquisition device that created the particular raw image data based on a name associated with the particular raw image data.

29. The image processing program of claim 28, wherein:
the retrieving process generates the indication of the type of image acquisition device that created the particular raw image based on characteristics of the particular raw image data.

30. The image processing program of claim 28, wherein:
the retrieving process generates the indication of the type of image acquisition device that created the particular raw image data based on characteristics of auxiliary data associated with the particular raw image data.

31. The image processing program of claim 28, further comprising:
an update process configured to add an additional rendering process to the set of rendering processes.

32. The image processing program of claim 31, wherein:
the update process is configured to add the additional rendering process based on the selection process determining that one of the set of rendering processes corresponds to the type of image acquisition device that created the raw image data.

* * * * *